April 6, 1954  J. L. BAUER  2,674,069
APPARATUS FOR GRINDING AND LAPPING VALVE SURFACES
Filed Feb. 25, 1953
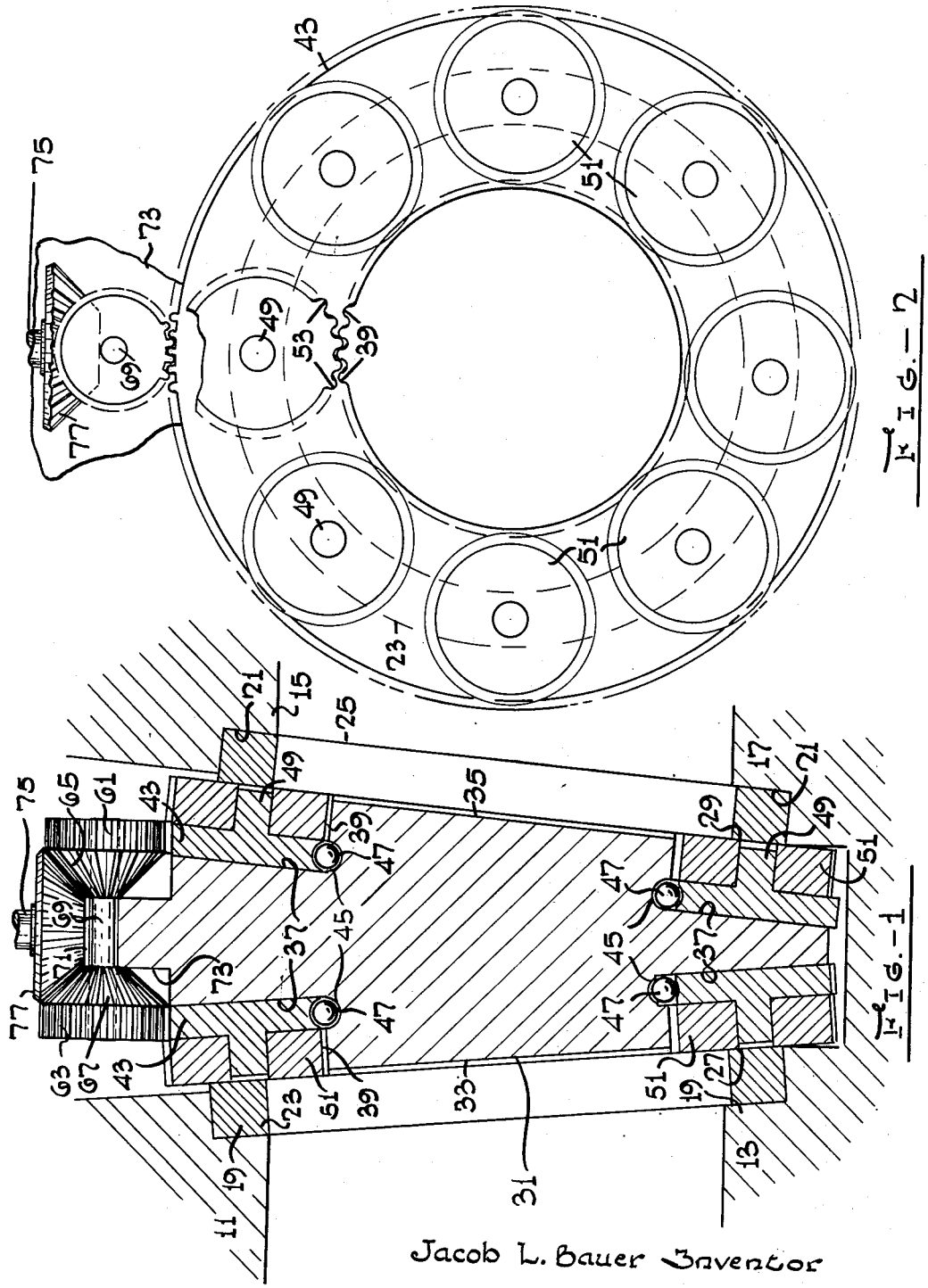
Jacob L. Bauer Inventor
By Edwin M. Thomas Attorney Patented Apr. 6, 1954

2,674,069

UNITED STATES PATENT OFFICE 2,674,069

APPARATUS FOR GRINDING AND LAPPING VALVE SURFACES

Jacob L. Bauer, Mountainside, N. J., assignor to Standard Oil Development Company, a corporation of Delaware Application February 25, 1953, Serial No. 338,761

10 Claims. (Cl. 51—120)

The present invention relates to an improved apparatus and method for grinding and lapping valve surfaces and other similarly disposed internal plane surfaces to produce an accurate and fine finish thereon. It has particular application to the apparatus for grinding and/or lapping opposed non-parallel internal plane surfaces though it can, with suitable simple modifications, where necessary, be adapted for use with other types of surfaces. Thus it may be used to surface other internal surfaces which are difficult of access with other lapping tools.

An object of the invention is to make it possible to machine, grind and/or lap accurate plane surfaces which are inaccessible to usual lapping mechanism or to other flat surfacing devices such as planers, shapers, grinders and the like. A further and particular object is to develop apparatus and method suitable for accurate and efficient lapping, grinding and the like of the opposed internal surfaces of gate valves. A still further and more specific object relates to apparatus and method for finishing and/or refinishing opposed valve seating surfaces for sliding wedge-type gate valves and related equipment.

The invention thus has special application to the original finishing and particularly to the refinishing of gate valves, especially valves of relatively large size which are used in petroleum and gas pipe lines, petroleum refineries, water works and the like. The maintenance of valves in such environments where large numbers are employed is a special problem. Both in the manufacture and in the maintenance of gate valves of this general type, especially in the larger sizes, the relation between the two opposed seating surfaces must be maintained with great precision for good valve operation. This is even more important, obviously, with solid wedge type discs or gates than with the split type.

The invention will be more fully understood by reference to a presently particularly preferred embodiment but it will be understood that it is not limited to such a specific form or to the specific uses mentioned above.

In the prior art certain devices and methods have been devised for surfacing or resurfacing the seating elements of sliding gate valves and the like. Examples are shown in U. S. Patents Nos. 2,360,550 and 2,408,260 where rotary grinding or lapping discs are mounted for insertion into a gate valve body. Aside from objections to simple rotary motion for facing or refacing finished surfaces where "tracking" occurs (because individual particles of abrasive grinding material follow a continuous path and cause grooving and other injury), these prior art devices have limitations with respect to smoothness of finish and with respect to the maintenance of accurate angles or planes of inclination and the like. The apparatus of the present invention is adapted to operate with a combination of rotary and translatory motion. Its highly rigid character makes it possible to maintain predetermined wedge angles or other predetermined planes of inclination with a high degree of accuracy. Such operations are further objects of the present invention and they are obtained by the use, in a novel manner, of a novel combination of planetary gears and surfacing elements and mounting and driving means therefor.

In the drawings annexed hereto and forming a part of this invention:

Fig. 1 is a vertical sectional view of one embodiment of a device or apparatus of the invention, showing in section also parts of a valve on which it may be used;

Fig. 2 is side elevational view, with parts omitted, of the device of Fig. 1.

Referring first to Fig. 1 there are shown fragmentary portions of a conventional gate valve body as indicated at 11, 13, 15, and 17. These portions are all integral parts of the valve body which may be cast, forged or otherwise prepared by known methods. Within the body are seating recesses or rabbets as indicated at 19 and 21. Within the recesses 19 and 21 are disposed valve seat ring members 23 and 25 respectively. In some valves, the seat rings may be omitted and the seating surfaces formed in the body itself.

The valve seat members 23 and 25 ordinarily are pressed or screwed snugly into place so as to form a tight leak-proof seal. The exposed faces 27 and 29 of these ring members form the valve seats or closing surfaces when the valve gate is moved into closed position. These surfaces, as well as the surfaces of the valve gate, become worn and deformed after a period of time and must be resurfaced in order for the valve to operate properly. The resurfacing of the gate can be accomplished with other means if desired but resurfacing of the faces 27 and 29 is a particular problem. Both must be finished with a high degree of accuracy and this is the purpose of the mechanism next to be described.

The surfacing or finishing mechanism which is adapted to grind or lap the valve seat surfaces 27 and 29 comprises a rigid wedge-shaped body member 31 having opposed plane divergent or wedge faces 33 and 35. These face respectively toward the valve seating surfaces 27 and 29 when the mechanism is inserted into a valve to be refinished.

The body member 31 is so made that its effective surfaces accurately conform with the desired wedge angle of the finished closure gate or slide used in the valve. In one type of valve which is widely used it has a wedge or divergence angle of 10°. In some cases other angles would be required. For uses in some other special applications it may be desirable to have the plane faces accurately parallel.

As shown in Fig. 2 the body member 31 is generally circular in cross-section. The outer rim portion of the body is rabbeted or cut away annularly to provide a plane seating surface 37. The central projecting portion of each face is provided with gear teeth 39 so as to constitute a sun gear on each face thereof essentially concentric with the body 31. The plane annular surfaces indicated at 37 provide a plane smooth seat or backing for a ring gear 43. The ring gears 43 each are concentric with but sit just behind the sun gear 39 which is cut on each face of the body or base member 31. An annular groove is provided within the circumference of plane backing surface 37 and just behind each sun gear as indicated at 45 to receive appropriate anti-friction bearings 47. These support the ring gears for relatively friction free operation. Thus, it will be seen that the ring gears 43 can be rotated about their axes and just behind the sun gears 39. The latter form an axle for the ring gears.

Each of the ring gears 43 is provided with a plurality of outwardly projecting studs or axle members 49. Each of the studs 49 is adapted to mount a planetary gear member 51. The number of such studs 49 and planetary gear members 51 may be varied depending upon the size of the unit and other factors. As shown in Fig. 2, eight planetary gear elements are employed in the illustrated embodiment. Each of the planetary gears 51 has gear teeth formed on the periphery thereof as indicated at 53 to mesh with the teeth 39 of the central and fixed sun gear portions of the body or base member 31. The back of each ring gear 43 abuts smoothly and firmly against the plane base of annular rabbet 37 and the back of each planetary gear 51 abuts smoothly and firmly against the front of its ring gear 43.

From the foregoing it will be apparent that rotation of the ring gears 43 carries the planetary gears 51 around an orbital path corresponding approximately to the face of the valve seat ring 23 or 25. The planetary gears rotate about their own axes as they travel through this orbital path so that a given point on any of the gears 51 travels in an epicyclic or approximately epicyclic path. In other words, any given point on one of the planetary gears or wheels has a combination of translatory and rotary motion. Since ring gear 43 fits smoothly against solid plane surface 37 and the plane back of each planetary gear 51 fits smoothly against the front of the ring gear, all these surfaces being plane, firm and well lubricated, it is clear that there is no play or lost motion between the parts. The gears 51 are made of a suitable lapping material, preferably cast iron, though other materials of adequate hardness and other desired properties may be used.

The outer face of each of the gears or wheels 51 may be provided with a suitable abrasive surface or they may be supplied periodically with a suitable abrasive or lapping compound. Thus, each of the gears or grinding members 51 may be provided with a sheet of abrasive material secured to its outer face or it may be fed intermittently or continuously with a supply of lapping compound to perform its facing and finishing operation on the valve seat members 23 and/or 25. In view of the type of motion imparted to the wheels there is no objectionable tracking, i. e. no particle of abrasive follows a single continuous and repeating path. Therefore no objectionable grooves are formed in the valve seat to mar its surface. The number of teeth on the sun gear is preferably not an exact multiple of the number of teeth on each planetary gear so as to avoid the possibility of any given abrasive particle following the same continuous epicycloidal path on repeated rotations of the ring gear 43.

Rotary motion is imparted to the ring gears by any suitable means, such as a pair of spur gears 61 and 63 each formed with or secured to a bevel gear 65 or 67 as shown best in Fig. 1. One or both of these combined bevel and spur gear elements may be mounted for free rotation on a shaft 69 which is mounted in turn in an opening 71 in a reduced extension portion 73 of base member 31. This portion 73 also extends upwardly to mount a drive shaft 75, being cut away to receive a bevel gear 77 on the bottom of drive shaft 75. The latter gear meshes with the bevel gears 65 and 67, respectively, so as to cause them to rotate when shaft 75 is rotated. Shaft 75 may be driven by suitable means, not shown, to impart rotation to the bevel gear 77, bevel gears 65 and 67, spur gears 61 and 63 which are rigidly secured to or made integrally with the bevel gears 65 and 67 and, thus, drive the ring gears 43. The latter, of course, carry the rotating and planetary gears 51 around their orbit and around the fixed sun gears. Alternatively only one of bevel gears 65 or 67 may be driven if it and its counterpart are both fixed to shaft 69. In the latter case, both ring gears move in the same direction. With the other arrangement, i. e., with one or both gears 65 or 67 free on shaft 69, the ring gears are driven in opposite directions. In this case the torque forces on opposite sides of the tool are opposite and balanced.

From the foregoing it will be understood that the grinding or lapping unit is simply lowered into the valve body, after the slide or gate is removed, and the shaft 75 is rotated to grind and lap the valve seating surfaces to the desired finished plane surface. The desired wedge angle is established with a high degree of accuracy. When grinding and/or lapping are completed the unit is withdrawn and the valve slide is reinserted.

It will be apparent that the invention comprises the use of a rigid body member of accurate dimensions and of accurate divergence angle when wedge shaped valve seats are to be ground. This device is equipped with firmly backed planetary grinding and lapping members driven through an orbital path by which they are caused to pass through translatory and rotary motions as they effect their smooth finishing operation. The apparatus is simple and sturdy and fills a long-felt need for the grinding of valves, especially the valves of medium to large sizes with a minimum of time and expense. It can also be used for other internal grinding or finishing operations such as liquid tight bearing bases etc.

As valves and the like are ground and reground repeatedly, and as the lapping gears 51 or their backing members gradually wear away, a time may come when the grinding tool will strike bottom in the valve body before the seat is finished. When this occurs suitable shims of adequately hard material (not shown) may be placed behind each of the planetary gears 51 or behind ring gears 43, or both. This will be obvious to those skilled in the art. Suitable retaining means, not shown, may be provided for keeping the ring gears 43 on their bases and for keeping gears 51 on studs 49, such as spring type retaining clips or rings, or the like. These are conventional in the art. Also, when adjustability in thickness is needed, the body member 31 may be split in two parts, approximately up the middle as seen in Fig. 1, and one or more shims of desired thickness inserted between the parts. In this case suitable bolts, not shown, or their equivalent, will be provided for uniting the two body parts and the shims into a firm, solid unit with an accurately controlled angular relationship between its two opposed plane faces. The provision of a solid and firm structure to maintain an accurate disposition of the plane lapping surfaces is an important feature. In all cases it will be understood that the angle of inclination of plane surface 37 is of basic importance.

It will be understood that variations in the details of the drive mechanism and other parts may be made without departing from the invention. Various modifications to meet the requirements of specific valves can be made by those skilled in the art. It will be obvious also that the invention is not limited to use in valves, being adaptable in internal grinding operations in various mechanisms where finely finished plane surfaces are required in relatively inaccessible places.

What is claimed is:

1. Apparatus for facing an internal plane surface comprising in combination a base holder member, adapted to be inserted between said opposed surfaces, a ring member rotatably mounted on said base member and adapted to face toward one of said surfaces, and a planetary surfacing unit mounted on said ring member for rotation about its own axis and orbital movement with said ring member.

2. Combination according to claim 1 wherein the base member comprises a sun gear and said surfacing unit comprises a gear element meshing with said sun gear.

3. Combination according to claim 1 wherein said base member comprises a sun gear, the surfacing unit is a planetary gear, and drive means are provided for rotating said ring member and thereby imparting rotary and orbital motion to said surfacing unit.

4. In apparatus of the character described, the combination of a base member adapted to be inserted between two opposed internal planar surfaces to be finished, a sun gear fixed rigidly to each of the opposite faces of said base member, a rotatable ring gear mounted on each side of said base member around and behind said sun gear, an accurate plane surface backing up said ring gear, and a planetary gear rotatably and orbitally supported by each of said ring gears and meshing with the related sun gear, each of said planetary gears comprising a grinding surface facing toward the adjacent internal planar surface.

5. Combination according to claim 4 in which the base member comprises an annular groove behind each sun gear and anti-friction bearings in said grooves to support said ring gears.

6. In apparatus of the character described the combination of a wedge shaped base member having two opposed plane angularly divergent face elements arranged at an accurately determined angle, centrally disposed sun gear element projecting outwardly from each of the opposed divergent face elements of said member, a ring gear mounted against each of said face elements and concentric with said sun gear, and a plurality of planetary gear and surfacing members orbitally disposed around each said sun gear and each carried for rotation about its own axis by the surrounding ring gear, and means for rotating each ring gear.

7. In apparatus of the character described, the combination of a generally circular body member having two opposed faces, an annular plane rabbeted surface surrounding each face, the planes of said rabbeted surfaces being disposed at an accurately determined divergent angle, a projecting sun gear element fixed to said body member and projecting concentrically from within the adjacent rabbeted surface, an annular member rotatably mounted around each said ring gear and firmly seated against said plane surface, a planetary gear and grinding element mounted on said annular member for rotation about its own axis and for orbital movement about and in mesh with said gun gear, the back of said planetary gear being firmly and accurately supported by said annular member to maintain the grinding face thereof in precise parallelism with the adjacent plane rabbeted surface, and means for driving said annular member to impart both orbital and rotational movement to said planetary gear.

8. In combination a solid body member having two opposed faces, a projecting sun gear fixed to each of said faces, an accurately machined annular plane surface surrounding each of said projecting sun gears, a pair of ring gears each having smooth plane inner and outer surfaces, a plurality of studs projecting from each said outer surface, each of said ring gears being rotatably mounted on said body with its inner plane surface abutting said annular plane surface, a planetary gear and finishing wheel mounted on each of said studs and in mesh with a sun gear, each of said planetary gears having a smooth plane back surface in abutment with the outer surface of its associated ring gear and a smooth outer surface adapted for lapping or grinding an opposing plane surface to be finished, and gear means mounted on said body for driving said ring gears with respect to said sun gears, to cause said planetary gears to revolve about their own axes and about said sun gears to perform a finishing operation on said opposing plane surface.

9. Combination according to claim 8 wherein said ring gears are arranged to be driven in opposite directions to neutralize torque.

10. In apparatus for finishing an annular internal plane surface, the combination of a rigid non-rotating body member having a plane annular backing surface surrounding a projecting area on one face thereof, a sun gear on said projecting area, a ring member concentric with said projecting area and sun gear and backed up against said plane backing surface, a planetary gear mounted rotatably on said ring member and backed by said member, said planetary gear being in mesh with said sun gear and having a plane outer finishing surface for performing a finishing operation on said internal plane surface, and means for rotating said annular member to impart rotary and translatory motion to said planetary gear.

References Cited in the file of this patent

UNITED STATES PATENTS

| Number | Name | Date |
|---|---|---|
| 637,249 | Hall | Nov. 21, 1899 |
| 771,194 | Williams | Sept. 27, 1904 |
| 1,091,918 | Eynon | Mar. 31, 1914 |
| 1,577,478 | Marburg | Mar. 23, 1926 |
| 2,572,485 | Hunter et al. | Oct. 23, 1951 |